United States Patent [19]
Yamaguchi et al.

[11] Patent Number: 6,166,149
[45] Date of Patent: Dec. 26, 2000

[54] HYDROPHILIC GRAFT POLYMER, PRODUCTION PROCESS THEREFOR, COMPOSITION CONTAINING THE POLYMER, AND USE THEREOF

[75] Inventors: Shigeru Yamaguchi, Yao; Masahito Takagi, Ibaraki; Takuya Saeki, Suita, all of Japan

[73] Assignee: Nippon Shokubai Co., Ltd., Osaka, Japan

[21] Appl. No.: 08/993,673

[22] Filed: Dec. 16, 1997

[30] Foreign Application Priority Data

Dec. 27, 1996 [JP] Japan ..................................... 8-351645
Aug. 14, 1997 [JP] Japan ..................................... 9-219625
Aug. 29, 1997 [JP] Japan ..................................... 9-234674

[51] Int. Cl.⁷ .............................. C08F 283/06; C02F 5/10
[52] U.S. Cl. .............................. 525/404; 525/63; 252/180
[58] Field of Search ....................... 525/63, 404; 252/180

[56] References Cited

U.S. PATENT DOCUMENTS

| | | |
|---|---|---|
| 3,963,805 | 6/1976 | Chu . |
| 4,612,352 | 9/1986 | Schafer et al. . |
| 4,659,481 | 4/1987 | Chen . |
| 5,420,211 | 5/1995 | Hughes et al. . |
| 5,952,432 | 9/1999 | Yamaguchi . |

FOREIGN PATENT DOCUMENTS

| | | |
|---|---|---|
| 0 011 833 | 6/1980 | European Pat. Off. . |
| 0 639 592 | 2/1995 | European Pat. Off. . |
| 2 289 543 | 5/1976 | France . |
| 55-071710 | 5/1980 | Japan . |
| 59-062614 | 4/1984 | Japan . |
| 07053645 | 2/1995 | Japan . |
| 09192691 | 7/1997 | Japan . |

*Primary Examiner*—David Buttner

[57] ABSTRACT

The invention provides: 1) a composition comprising a hydrophilic graft polymer of 60 to 98 wt %, a polyether compound of 20 to 40 wt %, and an unsaturated carboxylic acid type polymer of 0 to 5 wt %; 2) a polymer which is obtained by graft-polymerizing a monoethylenically unsaturated monomer onto a polyether compound having a repeating unit of —RCH—CH$_2$—O— of 30 mol % or more of the polyether compound, and has a purity of at least 75%; and 3) a scale inhibitor comprising a polymer which is obtained by graft-polymerizing a monoethylenically unsaturated monomer onto a polyether compound having ethylene oxide of 80 mol % or more as a structural unit, and has a hydroxyl group value of 30 mgKOH/g or more and an acid value of 200 mgKOH/g or more.

7 Claims, No Drawings

HYDROPHILIC GRAFT POLYMER, PRODUCTION PROCESS THEREFOR, COMPOSITION CONTAINING THE POLYMER, AND USE THEREOF

BACKGROUND OF THE INVENTION

A. Technical Field

The present invention relates to a hydrophilic graft polymer, a production process therefor, a composition containing the hydrophilic graft polymer, a scale inhibitor comprising the hydrophilic graft polymer, and a scale inhibition method using the hydrophilic graft polymer.

B. Background Art

A hydrophilic graft polymer, as obtained by graft-polymerizing an unsaturated carboxylic acid type monomer such as (meth)acrylic acid onto a polyether compound, is used alone or in the form of a composition for a scale inhibitor or for various other purposes. For example, compositions, comprising the following components: the above-mentioned hydrophilic graft polymer, the polyether compound which is a raw material thereof, and an unsaturated carboxylic acid type polymer which is a by-product in the production of the hydrophilic graft polymer, are disclosed in JP-A-55-71710, JP-A-59-62614, and JP-A-7-53645, and are applied for various uses such as detergent builders and dispersants of organic particles and inorganic particles.

However, any of the above-mentioned known compositions has problems in that dispersibility and gelation resistance are both low, and where they are applied for the above-mentioned uses, the desired performances cannot sufficiently be obtained. In addition, their viscosity is high and they are difficult to handle.

On the other hand, from the circumstances that water having high concentration of calcium carbonate or the like is used as a circulating water for efficiency of utilization of water resources, it is recently required for a scale inhibitor to have a high scale inhibition effect. The above-mentioned known compositions are also used as the scale inhibitor, but the scale inhibitability thereof is low, which do not satisfy a recent high scale inhibition standard.

As to conventional production processes for the above-mentioned hydrophilic graft polymer, the graft ratio of the unsaturated carboxylic acid type monomer to the polyether compound is low, and a large amount of polyether compound as used as the raw material remains unreacted. Therefore, there are problems in that any of the resultant hydrophilic graft polymers has poor purity, and in that where such polymers are used for the above-mentioned uses, the desired performances cannot sufficiently be obtained.

In a cooling water system, a boiler water system, a seawater desalting apparatus, a pulp digester, a black liquor concentrating tank, an oil field, and the like, precipitates (scales) such as calcium carbonate, calcium phosphate, zinc hydroxide, and magnesium silicate deposit on their inner walls, and as a result, various operational difficulties might occur such as decrease in heat efficiency or local corrosion.

In particular, where pipings made of iron are used in an aqueous system, there is the necessity to use a large amount of phosphoric acid compound, zinc salt, or the like as a corrosion inhibitor. In this case, formation of scales comprising calcium phosphate or zinc hydroxide causes problems.

U.S. Pat. No. 4,659,481 specification describes that a polymer comprising a monomer component having hydroxyl group and a monomer component having sulfonic acid group has an effect to inhibit scales of calcium phosphate, zinc hydroxide, or the like.

However, although such a polymer has an effect to some extent in inhibition of scale, since a monomer component having a specific structure is used, there is a problem in that the synthesis thereof is difficult.

SUMMARY OF THE INVENTION

A. Objects of the Invention

An object of the present invention is to provide a hydrophilic graft polymer-containing composition, which has excellent physical properties such as dispersibility and gelation resistance and is easy to handle, and a scale inhibitor having high scale inhibitability.

Another object of the present invention is to provide a hydrophilic graft polymer having a high graft ratio of the monoethylenically unsaturated monomer, only a small amount of unreacted polyether compound, and a high purity, and a production process and a use for the hydrophilic graft polymer.

In addition, another object of the present invention is to provide a scale inhibitor, which particularly has an effect to inhibit scales such as calcium phosphate and zinc hydroxide and is easily produced, and a method for inhibiting scales using the inhibitor.

B. Disclosure of the Invention

As a result of extensive investigations to solve the above-mentioned problems, the present inventors found that if the mutual proportions of the hydrophilic graft polymer, the polyether compound and the unsaturated carboxylic acid type polymer are controlled, physical properties of the above-mentioned composition are improved, and the composition becomes easy to handle, thus attaining the present invention.

That is to say, a hydrophilic graft polymer-containing composition, according to the present invention, comprises a hydrophilic graft polymer and a polyether compound as essential components, and optionally further comprises an unsaturated carboxylic acid type polymer, wherein the hydrophilic graft polymer is obtained by a process including the step of graft-polymerizing a monoethylenically unsaturated monomer containing an unsaturated carboxylic acid type monomer as an essential component onto a polyether compound, and wherein the unsaturated carboxylic acid type polymer is obtained by a process including the step of polymerizing only the monoethylenically unsaturated monomer. This composition is characterized in that mutual proportions of the hydrophilic graft polymer, the polyether compound, and the unsaturated carboxylic acid type polymer are such that the hydrophilic graft polymer is 60 to 98% by weight, the polyether compound is 20 to 40% by weight, and the unsaturated carboxylic acid type polymer is 0 to 5% by weight.

A scale inhibitor, according to the present invention, comprises the above-mentioned hydrophilic graft polymer-containing composition as an essential component.

In addition, as a result of extensive investigations, the present inventors further found that the above-mentioned problems can be solved if the above-mentioned graft polymerization is conducted in the presence of an organic peroxide and an acidic substance, thus attaining the present invention.

That is to say, a hydrophilic graft polymer (A), according to the present invention, is a polymer which is obtained by a process including the step of graft-polymerizing a monoethylenically unsaturated monomer containing an unsaturated carboxylic acid type monomer as an essential component onto a polyether compound having a number-average molecular weight of 100 or more and having a repeating unit represented by the following general formula:

—RCH—CH$_2$—O—

(wherein R represents at least one of a hydrogen atom and a methyl group, and both may be present in one molecule) in an amount of 30 mol % or more of the whole of the polyether compound, and has a purity of at least 75%. This hydrophilic graft polymer (A) is preferably obtained by a production process as mentioned below, but may be the one that is obtained by other processes.

A scale inhibitor, according to the present invention, comprises the above-mentioned hydrophilic graft polymer (A) of high purity as an essential component.

A process for producing a hydrophilic graft polymer, according to the present invention, is a process comprising the step of graft-polymerizing a monoethylenically unsaturated monomer containing an unsaturated carboxylic acid type monomer as an essential component onto a polyether compound having a number-average molecular weight of 100 or more and having a repeating unit represented by the following general formula:

—RCH—CH$_2$—O—

(wherein R represents at least one of a hydrogen atom and a methyl group, and both may be present in one molecule) in an amount of 30 mol % or more of the whole of the polyether compound in the presence of an organic peroxide and at least one acidic substance selected from the group consisting of organic sulfonic acid compounds, phosphoric acid compounds, and inorganic acids.

In addition, as a result of extensive investigations, the present inventors noted that a polymer obtained by graft-polymerizing a monoethylenically unsaturated monomer component onto a polyether compound having ethylene oxide as a structural unit is easily produced, and the inventors further found that the above-mentioned problems can be solved by specifying a hydroxyl group value and an acid value of such a polymer, thus attaining the present invention.

That is to say, a hydrophilic graft polymer (B), according to the present invention, is a hydrophilic graft polymer which is obtained by a process including the step of graft-polymerizing a monoethylenically unsaturated monomer component onto a polyether compound having ethylene oxide of 80 mol % or more as a structural unit, and is characterized by having a hydroxyl group value of 30 mgKOH/g or more and an acid value of 200 mgKOH/g or more.

A scale inhibitor, according to the present invention, comprises the above-mentioned hydrophilic graft polymer (B) as an essential component.

In the above-mentioned hydrophilic graft polymer (B), it is preferable that the polyether compound is one member selected from the group consisting of polyalkylene glycol, alkoxypolyalkylene glycol, and aryloxypolyalkylene glycol. Further, it is preferable that a sulfonic acid group-containing monomer and/or a hydroxyl group-containing monomer are used as at least part of the monoethylenically unsaturated monomer component.

The above-mentioned scale inhibitor is effective as a scale inhibitor for calcium phosphate or zinc hydroxide.

A method for inhibiting scales, comprising the step of adding the scale inhibitor, as mentioned above, and a phosphoric acid compound and/or a zinc salt to an aqueous system in a total amount of the addition of 0.5 to 50 ppm, greatly improves not only a scale inhibition effect in pipings, but also a corrosion inhibition effect, and is therefore very useful.

These and other objects and the advantages of the present invention will be more fully apparent from the following detailed disclosure.

DETAILED DESCRIPTION OF THE INVENTION

Hereinafter, the polyether compound and monoethylenically unsaturated monomer are first explained, the hydrophilic graft polymer and unsaturated carboxylic acid type polymer are then explained, and subsequently, the structure of the hydrophilic graft polymer-containing composition as a whole is explained, and lastly, the scale inhibitor is explained. The polyether itself is an essential component which constitutes the hydrophilic graft polymer-containing composition according to the present invention, but also is a raw material for obtaining the hydrophilic graft polymer which is another essential component. The monoethylenically unsaturated monomer is a raw material for obtaining the hydrophilic graft polymer, and also is a raw material for obtaining the unsaturated carboxylic acid type polymer which is blended, if necessary, for constituting the hydrophilic graft polymer-containing composition of the present invention.

[Polyether compound]

The polyether compound used in the present invention is a component which decreases viscosity and makes it easy to handle the composition. This polyether compound is a compound having the repeating unit represented by the general formula mentioned below in an amount of 30 mol % or more (preferably 50 mol % or more) of the whole. The polyether compound is obtained by polymerizing a cyclic ether containing ethylene oxide and/or propylene oxide as essential components, and if necessary, further containing other alkylene oxide, in the presence of a compound to be reacted, which becomes initiation point of polymerization, by the known methods and the like.

—RCH—CH$_2$—O—

(where, R represents at least one kind of hydrogen atom and methyl group, and may be present together in one molecule).

Examples of the other alkylene oxides used for obtaining the polyether compound are isobutylene oxide, 1-butene oxide, 2-butene oxide, trimethylethylene oxide, tetramethylethylene oxide, butadiene monoxide, styrene oxide, 1,1-diphenylethylene oxide, epifluorohydrin, epichlorohydrin, epibromohydrin, glycidol, butyl glycidyl ether, hexyl glycidyl ether, allyl glycidyl ether, phenyl glycidyl ether, 2-chloroethyl glycidyl ether, o-chlorophenyl glycidyl ether, ethylene glycol diglycidyl ether, bisphenol A diglycidyl ether, methacryl chloride epoxide, cyclohexene oxide, dihydronaphthalene oxide, vinyl cyclohexene monoxide, oxetane, tetrahydrofuran, 1,4-epoxycyclohexane, and the like. Those can be used in one kind or two or more kinds. It is necessary for the copolymerizable other alkylene oxide to be less than 70 mol % of the whole. If it is 70 mol % or more, the hydrophilic property decreases.

The compound to be reacted is a compound which becomes an initiation point of polymerization of the cyclic ether, and kind, molecular weight, and the like thereof are not particularly limited. Examples of the compound to be reacted are water; hydrogen; oxygen; carbon dioxide; alcohols; hydrogen halides; ammonia; amines; hydroxylamine; carboxylic acids; acid halides; lactones; aldehydes; benzene; and the like. Those can be used in one kind or two or more kinds. Of those, at least one member selected from the group consisting of water, alcohols, and amines is preferable as the compound to be reacted.

Examples of the alcohol are primary aliphatic alcohols having 1 to 22 carbon atoms, such as methanol, ethanol, n-propanol, or n-butanol; aromatic alcohols, such as phenol, iso-propyl phenol, octyl phenol, tert-butyl phenol, nonyl phenol, or naphthol; secondary alcohols having 3 to 18 carbon atoms, such as iso-propyl alcohol, or alcohol obtained by oxidizing n-paraffin; tertiary alcohols such as tert-butanol; diols, such as ethylene glycol, diethylene glycol, propane diol, butane diol, or propylene glycol; triols such as glycerin or trimethylol propane; polyols such as sorbitol; and the like. Those can be used in one kind or two or more kinds.

Examples of the amine are aniline, naphthylamine, ethylenediamine, dodecylamine, and the like. Those can be used in one kind or two or more kinds.

Reaction form of polymerization of a cyclic ether is not particularly limited,and polymerization may be any one of (1) anionic polymerization using hydroxides of alkali metals, strong alkalis, such as alcoholate, alkylamine, or the like as a base catalyst; (2) cationic polymerization using halides of metals and semi-metals, mineral acids, acetic acid, or the like as a catalyst; and (3) coordination polymerization using a combination of alkoxides of metals, such as aluminum, iron, or zinc, alkaline earth compounds, Lewis acids, and the like.

The polyether compound may be derivatives derived from the polyether obtained by the above polymerization. Examples of such derivatives are terminal group-converted compounds in which terminal functional groups of the polyether are converted, crosslinked products obtained by reacting the polyether with a crosslinking agent having a plurality of groups, such as carboxylic group, isocyanate group, amino group, or halogen group, and the like. The terminal group-converted compounds are preferably ones obtained esterifying at least one terminal hydroxyl group of the above-mentioned polyether with fatty acids or anhydrides thereof having 2 to 22 carbon atoms, such as acetic acid or acetic anhydride, or dicarboxylic acids such as succinic acid, succinic anhydride, or adipic acid.

It is preferable that the number-average molecular weight of the polyether compound is 100 or more. The upper limit of the number-average molecular weight is not particularly limited, but is preferable 100,000 or less. If the number-average molecular weight is less than 100, the graft ratio is decreased, and there is the problem that unreacted polyether compound increases. If the number-average molecular weight exceeds 100,000, the viscosity tends to increase, resulting in difficulty in handling during polymerization.

The weight-average molecular weight of the polyether compound is, for example, 100,000 or less, preferably 80,000 or less, and more preferably 50,000 or less. The lower limit of the weight-average molecular weight is not particularly limited, but is preferably 100 or more. Where the weight-average molecular weight exceeds 100,000, viscosity increases, making it difficult to handle during the polymerization. On the other hand, where the weight-average molecular weight is less than 100, there are problems in that: the compatibility decreases, so that the composition causes phase separation, and the scale inhibitability tends to decrease, and the graft ratio lowers, and a large amount of polyether compound remains unreacted.

The number of the repeating unit in the polyether compound is not particularly limited, and is preferably 2 or more, and more preferably 3 or more, in the polyether compound. R in the repeating unit is preferably that at least one thereof is hydrogen atom. [Monoethylenically unsaturated monomer]

The monoethylenically unsaturated monomer contains the unsaturated carboxylic acid type monomer as the essential component, and may further contain other unsaturated monomers copolymerizable with the unsaturated carboxylic acid type monomer.

The unsaturated carboxylic acid type monomer is an ethylenically unsaturated carboxylic acid, and/or an ester which forms carboxylic acid by hydrolysis.

Examples of the ethylenically unsaturated carboxylic acid are (meth)acrylic acid, maleic acid, fumaric acid, maleic anhydride, and the like. Those are used in one kind or two or more kinds. If the unsaturated carboxylic acid type monomer contains (meth)acrylic acid, and at least one member selected from the group consisting of maleic acid, fumaric acid, and maleic anhydride, as the essential components, the acid value and dispersibility are increased, so as to improve the scale inhibitability, which is preferable. If the unsaturated carboxylic acid type monomer contains acrylic acid and at least one member selected from the group consisting of maleic acid and maleic anhydride as the essential components, it is more preferable.

The ester which forms carboxylic acid by hydrolysis is not particularly limited so long as it is an ester of the above-mentioned ethylenically unsaturated carboxylic acid. Examples thereof are esters of maleic acid, such as monomethyl maleate, dimethyl maleate, monoethyl maleate, or diethyl maleate; esters of fumaric acid, such as monomethyl fumarate, dimethyl fumarate, monoethyl fumarate, or diethyl fumarate; esters of (meth)acrylic acid, such as methyl (meth)acrylate, ethyl (meth)acrylate, butyl (meth) acrylate, stearyl (meth)acrylate, hydroxyethyl (meth) acrylate, or hydroxypropyl (meth)acrylate; aminoalkyl (meth)acrylates such as dimethylaminoethyl (meth)acrylate; sulfoalkyl (meth) acrylates such as 2-sulfoethyl (meth) acrylate; and the like. Those are used in one kind or two or more kinds. In the case of performing polymerization using the above-mentioned ester among the unsaturated carboxylic acid type monomers to produce the hydrophilic graft polymer, a step is required which converts into carboxyl group by hydrolyzing a part or the whole of ester groups, after polymerization. Therefore, the unsaturated carboxylic acid type monomer preferably comprises the ethylenically unsaturated carboxylic acid as an essential component from the point that this conversion step makes it unnecessary.

The other unsaturated monomer copolymerizable with the unsaturated carboxylic acid type monomer is not particularly limited so long as it is monomers other than the unsaturated carboxylic acid type monomer. Examples thereof are amide group-containing monomers such as (meth)acryl amide; vinyl esters, such as vinyl acetate, vinyl propionate, vinyl pivalate, vinyl benzoate, or vinyl cinnamate; alkenes such as ethylene or propylene; aromatic vinyl monomers, such as styrene or styrenesulfonic acid; trialkyloxysilyl group-containing vinyl monomers such as vinyl trimethoxysilane or vinyl triethoxysilane; silicon-containing vinyl monomers such as γ-(methacryloyloxypropyl) trimethoxysilane; maleimide derivatives, such as maleimide, methyl maleimide, ethyl maleimide, propyl maleimide, butyl maleimide, octyl maleimide, dodecyl maleimide, stearyl maleimide phenyl maleimide, or cyclohexyl maleimide; nitrile group-containing vinyl monomers such as (meth)acrylonitrile; aldehyde group-containing vinyl monomers such as (meth) acrolein; sulfonic group-containing monomers, such as 2-acrylamido-2-methylpropanesulfonic acid, allylsulfonic acid, vinylsulfonic acid, methallylsulfonic acid, styrenesulfonic acid, 2-hydroxy-3-butenesulfonic acid, or 2-hydroxy-3-allyloxy-1-propanesulfonic acid; alkyl vinyl ethers such as methyl vinyl ether or ethyl vinyl ether; vinyl chloride, vinylidene chloride, allyl chloride, allyl alcohol; other functional group-containing monomers such as vinyl pyrrolidone; and the like. Those are used in one kind or two or more kinds.

The proportion of the unsaturated carboxylic acid type monomer in the monoethylenically unsaturated monomer is not particularly limited, but is preferably 60% by weight or more, more preferably 65% by weight or more, and most preferably 70% by weight or more, in the point of increasing acid value and dispersibility, and improving the scale inhibitability.

[Hydrophilic graft polymer]

General explanation of hydrophilic graft polymer

The hydrophilic graft polymer used in the present invention is a component which increases physical properties, such as dispersibility, gelation resistance, and the like, and imparts scale inhibitability, and is a polymer obtained by graft-polymerizing a monoethylenically unsaturated monomer onto the above polyether compound. The hydrophilic graft polymer comprises a polyether moiety originated from the polyether compound, and a graft chain moiety originated from the monoethylenically unsaturated monomer and obtained by polymerization of the monoethylenically unsaturated monomer.

Weight ratio of the polyether moiety and the graft chain moiety (polyether moiety/graft chain moiety) is not particularly limited, but is preferably 10/90 to 80/20, and more preferably 20/80 to 80/20, and from the point of increasing the scale inhibitability, most preferably 30/70 to 70/30. If the above weight ratio is less than 10/90, gelation resistance decreases, viscosity increases, making it difficult to handle, and the scale inhibitability tends to decrease. On the other hand, if the above weight ratio is larger than 80/20, the dispersibility tends to decrease.

Weight-average molecular weight of the hydrophilic graft polymer is 500 to 200,000, preferably 1,000 to 100,000, and more preferably 1,500 to 80,000. If the weight-average molecular weight is less than 500, the dispersibility may decrease. On the other hand, if the weight-average molecular weight exceeds 200,000, the dispersibility and gelation resistance decrease, and viscosity increases, making it difficult to handle, so that the scale inhibitability may decrease.

The purity of the hydrophilic graft polymer is preferably at least 75%, more preferably at least 80%, and still more preferably at least 85%. As to the purity of the hydrophilic graft polymer, an explanation will be made in the below-mentioned section "Hydrophilic graft polymer (A) and use thereof."

The hydrophilic graft polymer is preferably a polymer which is obtained by a process including the step of graft-polymerizing a monoethylenically unsaturated monomer component onto a polyether compound having ethylene oxide of 80 mol % or more as a structural unit, and has a hydroxyl group value of 30 mgKOH/g or more and an acid value of 200 mgKOH/g or more. The reason therefor will be explained in the below-mentioned section "Use of hydrophilic graft polymer (B)."

A process for producing the hydrophilic graft polymer used in the present invention is not particularly limited so long as it is a process including the step of graft-polymerizing the above monoethylenically unsaturated monomer onto the above polyether compound. For example, there is a process including the step of graft-polymerizing the above monoethylenically unsaturated monomer onto the above polyether compound in the presence of an organic peroxide.

The organic peroxide is used as an initiator of graft polymerization. Examples of the organic peroxide are ketone peroxides, such as methyl ethyl ketone peroxide, cyclohexanone peroxide, 3,3,5-trimethylcyclohexanone peroxide, methylcyclohexanone peroxide, methylacetoacetate peroxide, or acetylacetone peroxide; hydroperoxides, such as tert-butyl hydroperoxide, cumene hydroperoxide, diisopropylbenzene hydroperoxide, 2,5-dimethylhexane-2,5-dihydroperoxide, 1,1,3,3-tetramethylbutylhydroperoxide, or 2-(4-methylcyclohexyl)-propane hydroperoxide; dialkyl peroxides, such as di-tert-butyl peroxide, tert-butyl cumyl peroxide, dicumyl peroxide, α,α'-bis(tert-butyl peroxy) p-diisopropyl benzene, α,α'-bis(tert-butylperoxy) p-isopropylhexyne, 2,5-dimethyl-2,5-di(tert-butylperoxy) hexane, or 2,5-dimethyl-2,5-di(tert-butylperoxy)hexyne-3; peroxyesters, such as tert-butylperoxyacetate, tert-butylperoxylaurate, tert-butylperoxybenzoate, di-tert-butylperoxyisophthalate, 2,5-dimethyl-2 ,5-di(benzoylperoxy) hexane, tert-butylperoxyisopropyl carbonate, tert-butylperoxyisobutyrate, tert-butylperoxypivalate, tert-butylperoxyneodecanoate, cumylperoxyneodecanoate, tert-butylperoxy-2-ethylhexanoate, tert-butylperoxy-3,5,5-trimethyl cyclohexanoate, tert-butylperoxybenzoate, tert-butylperoxymaleic acid, cumylperoxyoctoate, tert-hexylperoxypivalate, or tert-hexylperoxyneohexanoate, cumylperoxyneohexanoate; peroxyketals, such as n-butyl-4,4-bis(tert-butylperoxy)valerate, 2,2-bis(tert-butylperoxy) butane, 1,1-bis(tert-butylperoxy)-3,3,5-trimethylcyclohexane, 1, 1-bis (tert-butylperoxy) cyclohexane, or 2,2-bis(tert-butylperoxy)octane; diacyl peroxides, such as acetyl peroxide, isobutyryl peroxide, octanoyl peroxide, decanoyl peroxide, lauroyl peroxide, 3,3,5-trimethylcyclohexanoyl peroxide, succinic acid peroxide, benzoyl peroxide, 2,4-dichlorobenzoyl peroxide, or m-toluyl peroxide; peroxydicarbonates, such as di-isopropyl peroxydicarbonate, di-2-ethylhexyl peroxydicarbonate, di-n-propyl peroxydicarbonate, bis-(4-tert-butylcyclohexyl) peroxydicarbonate, dimyristyl peroxydicarbonate, dimethoxyisopropyl peroxydicarbonate, di(3-methyl-3-methoxybutyl)peroxydicarbonate, or diallyl peroxydicarbonate; other organic peroxides such as acetyl-cyclohexylsulfonyl peroxide or tert-butylperoxyallyl carbonate; and the like. Those are used in one kind or two or more kinds.

The amount of the organic peroxide used is not particularly limited, but is preferably 0.1 to 30% by weight, and more preferably 0.5 to 20% by weight, to the monoethylenically unsaturated monomer. If the amount is less than 0.1% by weight, graft ratio to the polyether compound tends to decrease. On the other hand, if the amount exceeds 30% by weight, the organic peroxide is expensive, and is not economically preferable. It is preferable that the organic peroxide is separately added without previously mixing with the polyether compound, simultaneously with the ethylenically unsaturated monomer. However, the organic peroxide may previously added to the polyether compound, or may be added to the monoethylenically unsaturated monomer.

Decomposition catalyst of the organic peroxide, or reducing compound may be used together with the organic peroxide.

Examples of the decomposition catalyst of organic peroxide are metal halides such as lithium chloride or lithium bromide; metal oxides such as titanium oxide or silicon dioxide; metal salts of inorganic acids, such as hydrochloric acid, hydrobromic acid, perchloric acid, sulfuric acid, or nitric acid; carboxylic acids, such as formic acid, acetic acid, propionic acid, butyric acid, isobutyric acid, or benzoic acid, esters thereof, and metal salts thereof; heterocyclic amines, such as pyridine, indole, imidazole, or carbazole, and derivatives thereof; and the like. Those are used in one kind or two or more kinds.

Examples of the reducing compound are organometallic compounds such as ferrocene; inorganic compounds which generate metal ions (e.g., iron, copper, nickel, cobalt, manganese, or the like) such as iron naphthenate, copper naphthenate, nickel naphthenate, cobalt naphthenate, or manganese naphthenate; inorganic compounds, such as trifluoroborate ether adduct, potassium permanganate, or perchloric acid; sulfur-containing compounds such as homologs of cyclic sulfinic acids, such as sulfur dioxide, sulfite, sulfate, bisulfite, thiosulfite, sulfonate, benzene sulfinic acid and its substituent, or p-toluene sulfinic acid; mercapto compounds, such as octyl mercaptan, dodecyl mercaptan, mercaptoethanol, α-mercaptopropionic acid, thioglycolic acid, thiopropionic acid, sodium α-thiopropionate sulfopropyl ester, or sodium α-thiopropionate sulfoethyl ester; nitrogen-containing compounds, such as hydrazine, β-hydroxyethyl hydrazine or hydroxylamine; aldehydes, such as formaldehyde, acetaldehyde, propionaldehyde, n-butyraldehyde, isobutyl aldehyde, or isovaleraldehyde; ascorbic acid; and the like. Those are used in one kind or two or more kinds.

The graft polymerization may be conducted in the presence of an acidic substance together with the organic peroxide. The acidic substance has functions to improve graft ratio of the monoethylenically unsaturated monomer to the polyether compound, increase dispersibility of the hydrophilic graft polymer obtained, and increase the scale inhibitability. The acidic substance is not particularly limited so long as it is a substance having acidity, but at least one member selected from the group consisting of organosulfonic acid compounds, inorganic acids, and phosphoric acid compounds is preferable.

Examples of the organosulfonic acid compound are aliphatic sulfonic acids, such as methanesulfonic acid, ethanesulfonic acid, propanesulfonic acid, or octanesulfonic acid; aromatic sulfonic acids, such as benzenesulfonic acid, benzenedisulfonic acid, naphthalenesulfonic acid, or naphthalenedisulfonic acid; aromatic sulfonic acids having nucleus substituents group, such as chlorobenzenesulfonic acid, 1-naphthylamine-4-sulfonic acid (naphthionic acid), Tobias acid, peri acid, gamma acid (γ acid), J acid, Koch's acid, metanilic acid, toluenesulfonic acid, or dodecylbenzenesulfonic acid; and the like. Those are used in one kind or two or more kinds.

Examples of the inorganic acid are hydrochloric acid, hydrofluoric acid, hydrobromic acid, hydroiodic acid, perchloric acid, chlorous acid, hypochlorous acid, periodic acid, sulfuric acid, fuming sulfuric acid, sulfurous acid, nitric acid, fuming nitric acid, manganic acid, permanganic acid, chromic acid, dichromic acid, or the like. Those are used in one kind or two or more kinds.

Examples of the phosphoric acid compound are phosphoric acid, phosphorous acid, hypophosphorous acid, polyphosphoric acid, metaphosphoric acid, pyrophosphoric acid, methyl phosphate, ethyl phosphate, propyl phosphate, butyl phosphate, octyl phosphate, dodecyl phosphate, stearyl phosphate, phenyl phosphate, dimethyl phosphate, diethyl phosphate, dipropyl phosphate, dibutyl phosphate, dioctyl phosphate, didodecyl phosphate, distearyl phosphate, diphenyl phosphate, or the like. Those are used in one kind or two more kinds.

The amount of the acidic substance used is not particularly limited, but is preferably 0.05 to 20% by weight, and more preferably 0.1 to 15% by weight, to the polyether compound. If the amount of the acidic substance used is less than 0.05% by weight, a large amount of unreacted polyether compound remains, and graft ratio of the monoethylenically unsaturated monomer tends to decrease. On the other and, if the amount of the acidic substance used exceeds 20% by weight, the effect corresponding to the addition amount may not be exhibited. The acidic substance may previously be added to the polyether compound, but may be added to the monoethylenically unsaturated monomer.

Graft polymerization is preferably conducted in substantially solvent-less system, but a solvent may be used in an amount of 20% by weight or less to the whole of reaction system. If the amount exceeds 20% by weight of the whole of reaction system, graft ratio of the monoethylenically unsaturated monomer may be decreased. Where viscosity of the reaction system is high, use of a small amount of a solvent may be preferable in adding, and a solvent may be distilled off after addition.

The solvent is not particularly limited, but ones in which chain transfer coefficient of a solvent used to a solvent is as less as possible, or ones having a boiling point of 80° C. or higher which can be used in reaction under atmospheric pressure, are preferred. Examples of such a solvent are alcohols, such as iso-butyl alcohol, n-butyl alcohol, tert-butyl alcohol, ethylene glycol, propylene glycol, ethylene glycol monoalkyl ether, or propylene glycol monoalkyl ether; diethers, such as ethylene glycol dialkyl ether, or propylene glycol dialkyl ether; acetic acid type compounds, such as acetic acid, ethyl acetate, propyl acetate, butyl acetate, acetic acid ester of ethylene glycol monoalkyl ether, or acetic acid ester of propylene glycol monoalkyl ether; aromatic hydrocarbons, such as toluene or xylene; aliphatic hydrocarbons, such as cyclohexane; and the like. Those are used in one kind or two or more kinds. Examples of alkyl group in the above alcohols and diethers are methyl group, ethyl group, propyl group, butyl group, and the like.

Temperature of the graft polymerization is preferably 80° C. or higher, and more preferably 90 to 160° C., and most preferably 105 to 155° C. If the temperature is lower than 80° C., graft polymerization is difficult to proceed, and graft ratio of the monoethylenically unsaturated monomer tends to be decreased. On the other hand, if the temperature exceeds 160° C., thermal decomposition of the polyether compound and the hydrophilic graft polymer obtained may occur. In graft-polymerizing, it is preferable that a part or the whole of the polyether compound is charged at an initial stage. Where at least one monomer (A) selected from the group consisting of maleic acid, fumaric and, and maleic anhydride, and (meth)acrylic acid are used together as the monoethylenically unsaturated monomer, and such is graft-polymerized onto the polyether compound, it is preferable that a half amount or more of the monomer (A) and the acidic substance are previously mixed with the polyether compound, the mixture is heated to 80° C., the remainder of the monoethylenically unsaturated monomer and the organic peroxide are separately added to the heated mixture, and graft polymerization is conducted. By this process, molecular weight of the hydrophilic graft polymer obtained can easily be controlled.

A process for producing the hydrophilic graft polymer is not limited to the above-mentioned process.

Explanation of hydrophilic graft polymer (A)

In addition, in the above-mentioned process, if the process including the step of graft-polymerizing the monoethylenically unsaturated monomer onto the polyether compound in the presence of the organic peroxide and the acidic substance is used, the resultant hydrophilic graft polymer (A) has a high purity.

Explanation of hydrophilic graft polymer (B)

Next, an explanation will hereinafter be made on the process for producing the hydrophilic graft polymer (B) which displays excellent performance to inhibit scales of calcium phosphate or zinc hydroxide. Because the aforementioned raw materials and reaction method are also used in this process essentially, they will be mentioned in detail below, although some overlapping descriptions might be included.

The polyether compound used in the production of such a graft polymer (B) is a compound having ethylene oxide of 80 mol % or more as a structural unit, and is obtained by polymerizing ethylene oxide, and if necessary, other alkylene oxide, using water or alcohol as an initiating point in a well-known method. Examples of the alcohol for obtaining the polyether compound are primary alcohols having 1 to 22 carbon atoms, such as methanol, ethanol, n-propanol, or n-butanol; secondary alcohols having 3 to 18 carbon atoms; tertiary alcohols, such as t-butanol; diols, such as ethylene glycol, diethylene glycol, propane diol, butane diol, or propylene glycol; triols, such as glycerin trimethylol propane; and polyols, such as sorbitol. The other alkylene oxide copolymerizable with ethylene oxide is not particularly limited, but propylene oxide and/or butylene oxide are particularly preferred. Further, it is necessary that the other alkylene oxide copolymerizable with ethylene oxide is less than 20 mol % of the whole. If it is 20 mol % or more, a graft ratio of the graft polymer obtained is decreased. Further, as the polyether compound, compounds obtained by esterifying hydroxyl group of all of the terminals, or a part of the terminals, of the polyether obtained as described above with fatty acids having 2 to 22 carbon atoms, or dicarboxylic acids, such as succinic acid, succinic anhydride, maleic acid, maleic anhydride, or adipic acid are exemplified. However, those are not preferred in view of the purpose of improving an acid value.

By using one member selected from the group consisting of polyalkylene glycol, alkoxypolyalkylene glycol, and aryloxypolyalkylene glycol as those polyether compounds, a polymer having large acid value and hydroxyl group value can be obtained.

It is preferable that the molecular weight of the polyether compound is 100 or more, and it is preferable that the upper limit is 1,000 or less. If the molecular weight is less than 100, there is such a problem that the gelation resistance deteriorates. If the molecular weight exceed 1,000, the viscosity increases, resulting in difficulty to improve the degree of graft polymerization, so that there is such a problem that it is difficult to increase the hydroxyl group value and the acid value.

Examples of the monoethylenically unsaturated monomer component used in the production of such a graft polymer (B) are (meth)acrylic acid; maleic acid; fumaric acid; maleic anhydride; alkyl esters of maleic acid, such as dimethyl maleate or diethyl maleate; alkyl esters of fumaric acid, such as dimethyl fumarate or diethyl fumarate; alkyl (meth) acrylates, such as methyl (meth)acrylate, ethyl (meth) acrylate, butyl (meth)acrylate or stearyl (meth)acrylate; hydroxyalkyl (meth)acrylates, such as hydroxyethyl (meth) acrylate or hydroxypropyl (meth)acrylate; acetic acid alkenyl esters, such as vinyl acetate; aromatic vinyls, such as styrene; (meth) acrylonitrile; (meth) acrolein; (meth) acryl amides; dialkylaminoethyl (meth)acrylates, such as dimethylaminoethyl (meth) acrylate; 2-acrylamide-2-methylpropane-sulfonic acid; phenoxypolyethylene glycol (meth)acrylate; naphthoxypolyethylene glycol (meth) acrylate; monophenoxy-polyethylene glycol maleate; carbazole-polyethylene glycol (meth)acrylate; and the like. Those can be used alone or as mixtures of two or more thereof. Of those, (meth)acrylic acid, maleic acid, fumaric acid and maleic anhydride are preferred from the points of increasing the acid value of the graft polymer and increasing polyvalent metal ion chelatability and dispersibility. Further, it is preferable that 25% by weight or more of the monomer component is (meth)acrylic acid. If the (meth)acrylic acid is little, the acid value of the graft polymer obtained is small, and it is difficult to satisfy various performances such as polyvalent metal ion chelatability and dispersibility.

The acid value and the hydroxyl group value of the graft polymer (B) can be increased by using a sulfonic acid group-containing monomer and/or hydroxyl group-containing polymer as at least part of the monomer component. It is more preferred to use the hydroxyl group-containing polymer.

It is preferable that such a graft polymerization is conducted in the presence of a polymerization initiator. Known radical initiators can be used as a polymerization initiator, but organic peroxides are particularly preferred.

Examples of the organic peroxide are ketone peroxides, such as methyl ethyl ketone peroxide, cyclohexanone peroxide, 3,3,5-trimethylcyclohexanone peroxide, methylcyclohexanone peroxide, methylacetoacetate peroxide, or acetylacetone peroxide; hydroperoxides, such as tert-butyl hydroperoxide, cumene hydroperoxide, diisopropylbenzene hydroperoxide, 2,.5-dimethylhexane-2,5-dihydroperoxide, 1,1,3,3-tetramethylbutylhydroperoxide, or 2-(4-methylcyclohexyl) -propane hydroperoxide; dialkyl peroxides, such as di-tert-butyl peroxide, tert-butyl cumyl peroxide, dicumyl peroxide, α,α'-bis(tert-butyl peroxy) p-diisopropyl benzene, α,α'-bis(tert-butylperoxy) p-isopropylhexyne, 2,5-dimethyl-2,5-di(tert-butylperoxy) hexane, or 2,5-dimethyl-2,5-di(tert-butylperoxy)hexyne-3; peroxyesters, such as tert-butylperoxyacetate, tert-butylperoxylaurate, tert-butylperoxybenzoate, di-tert-butylperoxyisophthalate, 2,5-dimethyl-2 ,5-di (benzoylperoxy) hexane, tert-butylperoxyisopropyl carbonate, tert-butylperoxyisobutyrate, tert-butylperoxypivalate, tert-butylperoxyneodecanoate, cumylperoxyneodecanoate, tert-butylperoxy-2-ethylhexanoate, tert-butylperoxy-3,5,5-trimethyl cyclohexanoate, tert-butylperoxybenzoate, tert-butylperoxymaleic acid, cumylperoxyoctoate, tert-hexylperoxypivalate, or tert-hexylperoxyneohexanoate, cumylperoxyneohexanoate; peroxyketals, such as n-butyl-4,4-bis(tert-butylperoxy)valerate, 2,2-bis(tert-butylperoxy) butane, 1,1-bis(tert-butylperoxy)-3,3,5-trimethylcyclohexane, 1, 1-bis (tert-butylperoxy) cyclohexane, or 2,2-bis(tert-butylperoxy)octane; diacyl peroxides, such as acetyl peroxide, isobutyryl peroxide, octanoyl peroxide, decanoyl peroxide, lauroyl peroxide, 3,3,5-trimethylcyclohexanoyl peroxide, succinic acid peroxide, benzoyl peroxide, 2,4-dichlorobenzoyl peroxide, or m-toluyl peroxide; peroxydicarbonates, such as di-isopropyl peroxydicarbonate, di-2-ethylhexyl peroxydicarbonate, di-n-propyl peroxydicarbonate, bis-(4-tert-butylcyclohexyl) peroxydicarbonate, dimyristyl peroxydicarbonate, dimethoxyisopropyl peroxydicarbonate, di(3-methyl-3-methoxybutyl)peroxydicarbonate, or diallyl peroxydicarbonate; other organic peroxides such as acetylcyclohexylsulfonyl peroxide or tert-butylperoxyallyl carbonate; and the like. Those are used in one kind or two or more kinds.

The amount of the organic peroxide used is not particularly limited, but is preferably 0.1 to 30% by weight, and more preferably 0.5 to 20% by weight, to the monoethylenically unsaturated monomer. If the amount is less than 0.1% by weight, graft ratio to the polyether compound tends to decrease. On the other hand, if the amount exceeds 30% by weight, the organic peroxide is expensive, and is not economically preferable. It is preferable that the organic peroxide is separately added without previously mixing with the polyether compound, simultaneously with the ethylenically unsaturated monomer. However, the organic peroxide may previously added to the polyether compound, or may be added to the monoethylenically unsaturated monomer.

Decomposition catalyst of the organic peroxide, or reducing compound may be used together with the organic peroxide.

Examples of the decomposition catalyst of organic peroxide are metal halides such as lithium chloride or lithium bromide; metal oxides such as titanium oxide or silicon dioxide; metal salts of inorganic acids, such as hydrochloric acid, hydrobromic acid, perchloric acid, sulfuric acid, or nitric acid; carboxylic acids, such as formic acid, acetic acid, propionic acid, butyric acid, isobutyric acid, or benzoic acid, esters thereof, and metal salts thereof; heterocyclic amines, such as pyridine, indole, imidazole, or carbazole, and derivatives thereof; and the like. Those are used in one kind or two or more kinds.

Examples of the reducing compound are organometallic compounds such as ferrocene; inorganic compounds which generate metal ions (e.g., iron, copper, nickel, cobalt, manganese, or the like) such as iron naphthenate, copper naphthenate, nickel naphthenate, cobalt naphthenate, or manganese naphthenate; inorganic compounds, such as trifluoroborate ether adduct, potassium permanganate, or perchloric acid; sulfur-containing compounds such as homologs of cyclic sulfinic acids, such as sulfur dioxide, sulfite, sulfate, bisulfite, thiosulfite, sulfonate, benzene sulfinic acid and its substituent, or p-toluene sulfinic acid; mercapto compounds, such as octyl mercaptan, dodecyl mercaptan, mercaptoethanol, α-mercaptopropionic acid, thioglycolic acid, thiopropionic acid, sodium α-thiopropionate sulfopropyl ester, or sodium α-thiopropionate sulfoethyl ester; nitrogen-containing compounds, such as hydrazine, β-hydroxyethyl hydrazine or hydroxylamine; aldehydes, such as formaldehyde, acetaldehyde, propionaldehyde, n-butyraldehyde, isobutyl aldehyde, or isovaleraldehyde; ascorbic acid; and the like. Those are used in one kind or two or more kinds.

The graft polymerization may be conducted in the presence of an acidic substance together with the organic peroxide. The acidic substance has functions to improve graft ratio of the monoethylenically unsaturated monomer to the polyether compound, increase dispersibility of the hydrophilic graft polymer obtained, and increase the scale inhibitability. The acidic substance is not particularly limited so long as it is a substance having acidity, but at least one member selected from the group consisting of organosulfonic acid compounds, inorganic acids, and phosphoric acid compounds is preferable.

Examples of the organosulfonic acid compound are aliphatic sulfonic acids, such as methanesulfonic acid, ethanesulfonic acid, propanesulfonic acid, or octanesulfonic acid; aromatic sulfonic acids, such as benzenesulfonic acid, benzenedisulfonic acid, naphthalenesulfonic acid, or naphthalenedisulfonic acid; aromatic sulfonic acids having nucleus substituents group, such as chlorobenzenesulfonic acid, 1-naphthylamine-4-sulfonic acid (naphthionic acid), Tobias acid, peri acid, gamma acid (γ acid), J acid, Koch's acid, metanilic acid, toluenesulfonic acid, or dodecylbenzenesulfonic acid; and the like. Those are used in one kind or two or more kinds.

Examples of the inorganic acid are hydrochloric acid, hydrofluoric acid, hydrobromic acid, hydroiodic acid, perchloric acid, chlorous acid, hypochlorous acid, periodic acid, sulfuric acid, fuming sulfuric acid, sulfurous acid, nitric acid, fuming nitric acid, manganic acid, permanganic acid, chromic acid, dichromic acid, or the like. Those are used in one kind or two or more kinds.

Examples of the phosphoric acid compound are phosphoric acid, phosphorous acid, hypophosphorous acid, polyphosphoric acid, metaphosphoric acid, pyrophosphoric acid, methyl phosphate, ethyl phosphate, propyl phosphate, butyl phosphate, octyl phosphate, dodecyl phosphate, stearyl phosphate, phenyl phosphate, dimethyl phosphate, diethyl phosphate, dipropyl phosphate, dibutyl phosphate, dioctyl phosphate, didodecyl phosphate, distearyl phosphate, diphenyl phosphate, or the like. Those are used in one kind or two or more kinds.

The amount of the acidic substance used is not particularly limited, but is preferably 0.05 to 20% by weight, and more preferably 0.1 to 15% by weight, to the polyether compound. If the amount of the acidic substance used is less than 0.05% by weight, a large amount of unreacted polyether compound remains, and graft ratio of the monoethylenically unsaturated monomer tends to decrease. On the other and, if the amount of the acidic substance used exceeds 20% by weight, the effect corresponding to the addition amount may not be exhibited. The acidic substance may previously be added to the polyether compound, but may be added to the monoethylenically unsaturated monomer.

Graft polymerization is preferably conducted in substantially solvent-less system, but a solvent may be used in an amount of 20% by weight or less to the whole of reaction system. If the amount exceeds 20% by weight of the whole of reaction system, graft ratio of the monoethylenically unsaturated monomer may be decreased. Where viscosity of the reaction system is high, use of a small amount of a solvent may be preferable in adding, and a solvent may be distilled off after addition.

The solvent is not particularly limited, but ones in which chain transfer coefficient of a solvent used to a solvent is as less as possible, or ones having a boiling point of 80° C. or higher which can be used in reaction under atmospheric pressure, are preferred. Examples of such a solvent are alcohols, such as iso-butyl alcohol, n-butyl alcohol, tert-butyl alcohol, ethylene glycol, propylene glycol, ethylene glycol monoalkyl ether, or propylene glycol monoalkyl ether; diethers, such as ethylene glycol dialkyl ether, or propylene glycol dialkyl ether; acetic acid type compounds, such as acetic acid, ethyl acetate, propyl acetate, butyl acetate, acetic acid ester of ethylene glycol monoalkyl ether, or acetic acid ester of propylene glycol monoalkyl ether; aromatic hydrocarbons, such as toluene or xylene; aliphatic hydrocarbons, such as cyclohexane; and the like. Those are used in one kind or two or more kinds. Examples of alkyl group in the above alcohols and diethers are methyl group, ethyl group, propyl group, butyl group, and the like.

Temperature of the graft polymerization is preferably 100° C. or higher, and more preferably 110 to 160° C. If the temperature is lower than 100° C., the graft efficiency of the monomer component to the polyether compound is decreased. Further, if the temperature is higher than 160° C., there is a fear that thermal decomposition of the polyether compound and the graft polymer obtained should occur.

In graft-polymerizing, it is preferable that a part or the entire amount of the polyether compound is charged at the initial stage. Further, where at least one monomer selected from the group consisting of maleic acid, fumaric acid, and maleic anhydride, and (meth)acrylic acid are used as the monomer component to be graft-polymerized onto the polyether compound, it is preferable to previously mix a half or more amount of maleic acid, fumaric acid, and maleic anhydride with the polyether compound, heating the mixture at 100° C. or higher, separately adding the remaining monomer component and the polymerization initiator, and conduct graft polymerization. By this process, the introduction ratio of maleic acid, fumaric acid, and maleic anhydride into the graft polymer (B) can be greatly improved, and further, the molecular weight of the graft polymer (B) can be controlled.

The graft polymer obtained above can be used as a scale inhibitor as it is, but if necessary, at least one member selected from the group consisting of (meth)acrylic acid polymers; maleic acid polymers; carboxyl group-containing low molecular weight polymers, such as acrylic acid/3-allyloxy-1,2-propane diol copolymer, acrylic acid/2-allyloxy-1,2-propane diol copolymer, acrylic acid/2-hydroxy-3-allyloxyl-1-propane sulfonic acid copolymer, acrylic acid/maleic acid copolymer, acrylic acid/allyl alcohol copolymer, acrylic acid/hydroxymethacrylate copolymer, maleic acid/ethylenesulfonic acid copolymer, maleic acid/styrene copolymer, maleic acid/pentene copolymer, maleic acid/allyl alcohol copolymer, maleic acid/ethylene copolymer, maleic acid/butadiene copolymer, acrylic acid polymer, maleic acid polymer, aspartic acid polymer, or glyoxylic acid type polymer; inorganic polyphosphoric acid salts, such as organosulfonic acid, sodium tripolyphosphate, or sodium hexametaphosphate; phosphonic acids, such as nitrotrimethylene phosphonic acid, hydroxyethylidene phosphonic acid, ethylenediamine tetramethylene phosphonic acid, or phosphonobutane tricarboxylic acid; metal salts, such as zinc, chromium, or manganese; anticorrosives; alga preventing agents; preservatives; antimolds; antibacterial agents; slime controlling agents; chelating agents, such as ethylenediamine tetraacetic acid (EDTA), diethylenetriamine pentaacetic acid (DTPA), hydroxyiminodisuccinic acid (HIDS), iminodisuccinic acid (IDS), or citric acid; can lubricants; deoxidizers; sludge dispersants; and carry-over preventing agents can be added to prepare a scale inhibitor. The amount of the addition thereof is not especially limited.

[Unsaturated carboxylic acid type polymer]

The unsaturated carboxylic acid type polymer used in the present invention is not an essential component which constitutes the composition of the present invention, but can increase acid value, and impart polyvalent metal ion chelatability to the composition. The unsaturated carboxylic acid type polymer is a polymer obtained by polymerizing only the monoethylenically unsaturated monomer explained in detail above.

Weight-average molecular weight of the unsaturated carboxylic acid type polymer is preferably 500 to 200,000, and more preferably 1,000 to 100,000. If the weight-average molecular weight is less than 500, dispersibility may decrease. On the other hand, if the weight-average molecular weight exceeds 200,000, the composition becomes turbid, resulting in deterioration of appearance, and also viscosity increases, making it difficult to handle. Further, scale inhibitability and dispersibility tend to decrease.

Acid value of the unsaturated carboxylic acid type polymer is preferably 200 to 1,200 mgKOH/g, and more preferably 300 to 1,000 mgKOH/g. If the acid value is less than 200 mgKOH/g, the acid value and dispersibility of the composition tend to decrease. On the other hand, if the acid value exceeds 1,200 mgKOH/g, the unsaturated carboxylic acid type polymer is decreased in compatibility with the hydrophilic graft polymer and polyether compound, the composition does not become homogeneous, and phase separation may occur.

The unsaturated carboxylic acid type polymer may be one obtained by, for example, radically polymerizing the above monoethylenically unsaturated monomer in the presence of an initiator, but may be one obtained as a by-product in graft-polymerizing the monoethylenically unsaturated monomer onto the polyether compound in the presence of the organic peroxide.

Specific examples of the monoethylenically unsaturated monomer, polyether compound, and organic peroxide, which are used in obtaining by radical polymerization or graft polymerization of the unsaturated carboxylic acid type polymer, the preferred examples thereof, polymerization conditions, and the like are the same as explained in the above section of the hydrophilic graft polymer.

[Hydrophilic graft polymer-containing composition and use thereof]

The hydrophilic graft polymer-containing composition according to the present invention comprises the hydrophilic graft polymer and the polyether compound as the essential components, may further comprise the unsaturated carboxylic acid type polymer, and if necessary, can comprise other components described after. Blending proportion of the hydrophilic graft polymer is 60 to 98% by weight, preferably 65 to 98% by weight, and more preferably 70 to 98% by weight, of the total of three components (hydrophilic graft polymer, polyether compound, and unsaturated carboxylic acid type polymer). If the blending proportion of the hydrophilic graft polymer is less than 60% by weight of the total of three components, dispersibility decreases, and scale inhibitability decreases. On the other hand, if the proportion exceeds 98% by weight of the total of three components, viscosity increases, making it difficult to handle.

Blending proportion of the polyether compound is 2 to 40% by weight, preferably 2 to 35% by weight, and more preferably 2 to 30% by weight, of the total of three components. If the blending proportion of the polyether compound is less than 2% by weight of the total of three components, viscosity increases, making it difficult to handle. On the other hand, if the proportion exceeds 40% by weight, dispersibility decreases.

Blending proportion of the unsaturated carboxylic acid type polymer is 0 to 5% by weight, preferably 0 to 4% by weight, and more preferably 0 to 3% by weight, of the total of the tree components. If the blending proportion of the unsaturated carboxylic acid type polymer exceeds 5% by weight of the total of the tree components, the composition becomes turbid, resulting in deterioration of appearance, and its viscosity increases, making it difficult to handle. Further, scale inhibitability may decrease.

The hydrophilic graft polymer-containing composition according to the present invention can contain other components. Examples of the other components are enzymes, such as proteases, (alkali) lipases, or (alkali)cellulases; surface active agents, such as anionic surface active agents, nonionic surface active agents, cationic surface active agents, or amphoteric surface active agents; alkali builders, such as silicic acid salts, carbonic acid salts, or sulfuric acid salts; chelate builders, such as diglycolic acids, oxycarboxylic acid salts, EDTA (ethylenediamine tetraacetic acid), DTPA (diethylenetriamine hexaacetic acid), or citric acid; carboxyl group-containing low molecular weight polymers; re-attachment preventing agents; florescent agents; bleaching agents; perfumes; dispersants; organosulfonic acids; inorganic polyphosphoric acids: phosphonic acid; metal salts, such as zinc, chromium, or manganese; anticorrosives; slime controlling agents; chelating agents; alga preventing agents; preservatives; antimolds; antibacterial agents; can-cleaning agents; deoxidizers; sludge dispersants; carry-over preventing agents; bases; or the like. Those other components may be used in only one kind, or may be used by mixing two or more kinds. The blending proportion is not particularly limited.

Examples of the anionic surface active agent are alkylbenzenesulfonic acid salt, alkyl or alkenyl ether sulfuric acid salt, alkyl or alkenyl sulfuric acid salt, $\alpha$-olefin sulfonic acid salt, $\alpha$-sulfofatty acid or ester salt, alkanesulfonic acid salt, saturated or unsaturated fatty acid salt, alkyl or alkenyl ether carboxylic acid salt, amino acid type surface active agent, N-acylamino acid type surface active agent, alkyl or alkenyl phosphoric acid ester or salt thereof, and the like.

Examples of the nonionic surface active agent are polyoxyalkylene alkyl or alkenyl ether, polyoxyethylene alkylphenyl ether, higher fatty acid alkanol amide or its alkylene oxide adduct, saccharose fatty acid ester, alkyl glycoside, fatty acid glycerine monoester, alkylamine oxide, and the like.

Examples of the cationic surface active agent are quaternary ammonium salt, and the like.

Examples of the amphoteric surface active agent are carboxyl type or sulfobetain type amphoteric surface active agent, and the like.

Examples of the base are hydroxides of alkali metals or alkali earth metals, such as sodium hydroxide, potassium hydroxide, calcium hydroxide, or lithium hydroxide; carbonates of alkali metals or alkali earth metals, such as sodium carbonate, calcium carbonate, or lithium carbonate; amines, such as ammonia, monoethanolamine, diethanolamine, or triethanolamine; and the like. Those are used in one kind or two or more kinds.

A process for producing the hydrophilic graft polymer-containing composition according to the present invention is not particularly limited, and includes, for example, the following (1) to (3).

(1) The above-mentioned each component is previously provided, and is mixed while controlling such that the respective blending proportion satisfies the above range, thereby producing the composition.

(2) If the blending proportion of each component satisfies the above range with the reaction mixture obtained by the production process as described in the above section of hydrophilic graft polymer, this reaction mixture is directly used as the composition.

(3) The above-mentioned each component is added to the reaction mixture obtained by the production process described in the above section of the hydrophilic graft polymer, and the respective blending proportion is controlled so as to satisfy the above range, thereby producing the composition.

The hydrophilic graft polymer-containing composition according to the present invention has high physical properties, such as dispersibility, gelation resistance, has excellent scale inhibitability, and has low viscosity, making it easy to handle. Therefore, the composition is used in uses, such as scale inhibitors mentioned after, builders for detergent, fiber treating agents, pigment dispersants, organic and inorganic solid particle dispersants, assistants for paper-making, cement additives, dispersants for CWM, foaming agents, foam reinforcing agents, compatibilizers, solubilizers, rust preventing agents, emulsifiers, assistants for dyeing, and the like.

The scale inhibitor according to the present invention contains the above-mentioned hydrophilic graft polymer-containing composition as the essential component, strongly disperses organic particles which are sparingly soluble in water, such as calcium carbonate, and prevents generation of scales. This scale inhibitor contains the hydrophilic graft polymer and the polyether compound as the essential components, may further contain the unsaturated carboxylic acid type polymer, and if necessary, can contain the above-mentioned other components.

The weight-average molecular weight of the hydrophilic graft polymer contained in the scale inhibitor is not particularly limited as long as it is 500 to 200,000, as mentioned above, but if the upper limit is 50,000, the scale inhibitability is improved, which is preferable. The upper limit of the weight-average molecular weight of the hydrophilic graft polymer is more preferably 20,000, and most preferably 10,000.

The weight-average molecular weight of the polyether compound contained in the scale inhibitor is not particularly limited so long as it is 100,000 or less, as mentioned before. However, if it is 20,000 or less, viscosity decreases, making it easy to handle, which is preferable. The upper limit of the weight-average molecular weight of the polyether compound is more preferably 5,000.

The scale inhibitor further increases the scale inhibitability if gelation resistance of the hydrophilic graft polymer is high. Examples of the hydrophilic graft polymer having high gelation resistance are hydrophilic graft polymers containing sulfonic acid group and/or hydroxyl group, which can be obtained by, for example, graft-polymerizing hydroxyalkyl (meth)acrylates, or monoethylenically unsaturated monomers, such as sulfonic group-containing monomers, onto the polyether compound.

The scale inhibitor may be one containing other components other than the hydrophilic graft polymer. Examples of the other components are carboxyl group-containing low molecular weight polymers, such as acrylic acid/3-allyloxy-1,2-propane diol copolymer, acrylic acid/2-allyloxy-1,2-propane diol copolymer, acrylic acid/2-hydroxy-3-allyloxyl-1-propane sulfonic acid copolymer, acrylic acid/maleic acid copolymer, acrylic acid/allyl alcohol copolymer, acrylic acid/hydroxymethacrylate copolymer, maleic acid/ethylenesulfonic acid copolymer, maleic acid/styrene copolymer, maleic acid/pentene copolymer, maleic acid/allyl alcohol copolymer, maleic acid/ethylene copolymer, maleic acid/butadiene copolymer, acrylic acid polymer, maleic acid polymer, aspartic acid polymer, or glyoxylic acid type polymer; inorganic polyphosphoric acid salts, such as organosulfonic acid, sodium tripolyphosphate, or sodium hexametaphosphate; phosphonic acids, such as nitrotrimethylene phosphonic acid, hydroxyethylidene phosphonic acid, ethylenediamine tetramethylene phosphonic acid, or phosphonobutane tricarboxylic acid; metal salts, such as zinc, chromium, or manganese; anticorrosives; alga preventing agents; preservatives; antimolds; antibacterial agents; slime controlling agents; chelating agents, such as ethylenediamine tetraacetic acid (EDTA), diethylenetriamine pentaacetic acid (DTPA), hydroxyiminodisuccinic acid (HIDS), iminodisuccinic acid (IDS), or citric acid; can lubricants; deoxidizers; sludge dispersants; carry-over preventing agents; and the like. Those other components may be used in one kind, or may be used in two or more kinds. The blending amount thereof is not particularly limited.

[Hydrophilic graft polymer (A) and use thereof]

The hydrophilic graft polymer (A) according to the present invention is a polymer obtained by graft-polymerizing the above-mentioned monoethylenically unsaturated monomer onto the above-mentioned polyether compound. The purity of this hydrophilic graft polymer is at least 75%, preferably at least 80%, and more preferably at least 85%. If the purity is less than 75%, the purity is low and dispersibility is decreased. As a result, where it is used for the scale inhibitor or the like mentioned below, the desired performances cannot sufficiently be obtained.

The hydrophilic graft polymer (A) of the present invention has high purity and high dispersibility. Therefore, it is preferably used for the scale inhibitor below mentioned, builders for detergent, fiber treating agents, pigment dispersants, organic and inorganic particle dispersants, assistants for paper-making, cement additives, dispersants for CWM, foaming agents, foam reinforcing agent, compatibilizers, solubilizers, rust preventing agents, emulsifiers, assistants for dyeing, and the like.

This hydrophilic graft polymer (A) can be directly dissolved in a solvent such as water or alcohol and used for the above uses, but may be used by adding a base to convert to a salt of carboxylic acid. Examples of the base are hydroxides of alkali metals and alkali earth metals, such as sodium hydroxide, potassium hydroxide, calcium hydroxide, or lithium hydroxide; carbonates of alkali metals and alkali earth metals, such as sodium carbonate, calcium carbonate, or lithium carbonate; amines, such as ammonia, monoethanolamine, diethanolamine, or triethanolamine; and the like. Those are used alone or in two or more kinds thereof. As the solvent, water is preferable.

The process for producing the hydrophilic graft polymer (A) of the present invention is not particularly limited, and the above-mentioned production process (such as the process including the step of graft-polymerizing the monoethylenically unsaturated monomer onto the polyether compound in the presence of the organic peroxide and the acidic substance) can be exemplified as the preferable one. The hydrophilic graft polymer (A) as obtained by this production process is such that graft ratio of the monoethylenically unsaturated monomer is high, and its purity is high.

The scale inhibitor according to the present invention contains this hydrophilic graft polymer (A) as an essential component, and strongly disperses water-insoluble inorganic particles, such as calcium carbonate, thereby inhibiting formation of scales.

The scale inhibitor further improves the scale inhibitability if gelation resistance of the hydrophilic graft polymer (A) is high. The above-mentioned hydrophilic graft polymer (A) has high gelation resistance as compared with conventional polycarboxylic acid type polymers. Examples of the hydrophilic graft polymer (A) having high gelation resistance are hydrophilic graft polymers (A) having sulfonic acid group and/or hydroxyl group. Those can be obtained by, for example, graft-polymerizing monoethylenically unsaturated monomers, such as hydroxyalkyl (meth)acrylates or sulfonic acid group-containing monomers, onto the polyether compound.

The scale inhibitor may contain components other than the hydrophilic graft polymer (A). Examples of the other components are organosulfonic acids; phosphoric acid compounds, such as polymerized phosphoric acid salts or phosphonic acid salts; salts of metals, such as zinc, chromium, or manganese; corrosion inhibitors; slime controlling agents; chelating agents; can-cleaning agents; deoxidizers; anticorrosives; sludge dispersants; scale dissolution removers; carry-over preventives; can-protecting agents; ion-exchange resin detergents; OSR type detergents; and the like. Those components may be used alone or in two or more kinds thereof. The blending amount is not particularly limited.

[Use of hydrophilic graft polymer (B)]

The scale inhibitor, according to the present invention, is characterized by comprising a polymer (B) which is obtained by a process including the step of graft-polymerizing the monoethylenically unsaturated monomer component onto the polyether compound and has a hydroxyl group value of 30 mgKOH/g or more and an acid value of 200 mgKOH/g or more. By making the polymer (B) have the hydroxyl group value of 30 mgKOH/g or more, the scale inhibitability to zinc hydroxide is greatly improved. By making the polymer (B) have the acid value of 200 mgKOH/g or more, the scale inhibitability to calcium phosphate and calcium carbonate is greatly improved. The hydroxyl group value is preferably 50 mgKOH/g or more, and more preferably 100 mgKOH/g or more. The acid value is preferably 220 mgKOH/g or more, and more preferably 240 mgKOH/g or more.

[Method for inhibiting scales]

Next, the method for inhibiting scales using the scale inhibitor of the present invention is explained.

The scale inhibitor of the present invention is added as it is, to an aqueous system, such as cooling water system, or boiler water system, or to oil field. When the scale inhibitor contains components other than the above-mentioned graft polymer, it can be added separately. In adding the scale inhibitor to an aqueous system, it is preferable to add the same in combination with phosphoric acid type compound and/or zinc salt. The reason for this is that both effects of preventing corrosion of iron pipings used as a passageway of an aqueous system, and of preventing deposition of scales can be increased. Examples of the phosphoric acid type compound are polymerized phosphoric acid (salt), phosphoric acid (salt), phosphorous acid (salt), and the like, and examples of the zinc salt are zinc nitrate, zinc phosphate, zinc chloride, and the like. It is preferable that the scale inhibitor of the present invention is added in an amount of 0.5 to 50 ppm as the total amount with the phosphoric acid type compound and/or zinc salt.

The scale inhibitor according to the present invention can be directly added to aqueous system, such as cooling water system, boiler water system, seawater desalination apparatus, pulp digester, or black liquid concentration tank, or to oil field. The addition amount thereof is 1 to 100 ppm. Where the scale inhibitor contains other components other than the above hydrophilic graft polymer, those can be separately added.

The scale inhibitor according to the present invention can be used for inhibition and removal of scales, such as calcium carbonate, calcium phosphate, zinc hydroxide, barium sulfate, calcium sulfate, calcium sulfite, calcium silicate, magnesium silicate, zinc phosphate, basic zinc carbonate, silicic salts, silica, or iron.

(Effects and Advantages of the Invention):

The hydrophilic graft polymer-containing composition according to the present invention has excellent physical properties, such as dispersibility, gelation resistance, and has low viscosity, making it easy to handle.

In the production process for the hydrophilic graft polymer according to the present invention, the graft ratio of the monoethylenically unsaturated monomer is high, and unreacted polyether compound is less.

The hydrophilic graft polymer according to the present invention is such that since the unreacted polyether compound is less, the purity is high and dispersibility is high.

The scale inhibitor according to the present invention has high scale inhibitability, and is effective in inhibiting and removing scales, such as calcium carbonate.

The scale inhibitor of the present invention is easily produced, and the scale inhibition method using such a scale inhibitor is particularly effective in inhibition of scales of calcium phosphate or zinc hydroxide.

DETAILED DESCRIPTION OF THE PREFERRED EMBODIMENTS

Hereinafter, the present invention is illustrated in more detail by the following examples of some preferred embodiments in comparison with comparative examples not according to the invention. However, the present invention is not limited to the below-mentioned examples.

EXAMPLE 1

100 Parts by weight of phenoxypolyethylene glycol having weight-average molecular weight of 530 (number-average molecular weight: 530) (obtained by adding 10 mols, on the average, of ethylene oxide to phenol), and 51.8 parts by weight of maleic acid were charged into a glass reactor equipped with a thermometer, a stirrer, a nitrogen introduction pipe, and a reflux condenser, and the charged materials were heated under nitrogen stream to obtain a solution. This solution was heated to a temperature of 136° C. under stirring. Next, while maintaining the temperature of liquid at 135 to 137° C., 48.2 parts by weight of acrylic acid, and 10 parts by weight of PERBUTYL C (containing 90% of tert-butylcumyl peroxide, a product of Nippon Oils and Fats Co.) were separately added dropwise continuously to the above solution for 1 hour. For another 1 hour, stirring of the reaction mixture was continued to obtain a hydrophilic graft polymer-containing composition. Viscosity of this composition was measured using a B-type viscometer, and was found to be 12,000 cps (100° C.).

The composition obtained was neutralized using sodium hydroxide to convert carboxyl group contained in the composition into its sodium salt, and the composition was heated and evaporated to dryness. This dry material was extracted with a dichloromethane using a Soxhlet's extractor, the component contained in the extract was analyzed with GPC and NMR, and it was confirmed that this component was phenoxypolyethylene glycol (polyether compound) of the raw material.

Next, when the residue after extraction was separated using hydrophobic chromatography, it was fractionated into two parts. Each fraction was analyzed with GPC and NMR. From the analytical result, it was found that one of two fractions was a hydrophilic graft polymer (weight-average molecular weight 4,960) comprising a polyether part and a graft chain moiety in which maleic acid and acrylic acid were graft-polymerized. Ratio of the polyether moiety and the graft chain moiety (polyether moiety/graft chain moiety) was 39.8/60.2. It was found that the other of the two fractions was an unsaturated carboxylic acid type polymer (weight-average molecular weight 1,240) in which maleic acid and acrylic acid were graft-polymerized.

Mutual proportions of the hydrophilic graft polymer, polyether compound, and unsaturated carboxylic acid type polymer, contained in the composition obtained were that the hydrophilic graft polymer was 83% by weight, the polyether compound was 16% by weight, and the unsaturated carboxylic acid type polymer was 1% by weight, in the total of three components.

Scale inhibition performance test, dispersibility test, and gelation resistance test mentioned below were conducted on the composition obtained. As a result,. percentage of scale inhibition was 98%, dispersibility was 790 ppm, and gelation resistance was 5 ppm.

[Scale inhibition performance test]

100 ml of a test liquid having pH of 8.5 comprising 1 mg/l of the hydrophilic graft polymer-containing composition, 278 mg/l (calcium: 100 mg/l) of calcium chloride, and 210 mg/l of sodium hydrogen carbonate, which were adjusted using NaOH aqueous solution and/or HCl aqueous solution, were charged into a vessel, and this vessel was sealed with a plug, and was allowed to stand at 80° C. for 20 hours. After standing, the test liquid was filtered with a membrane filter of 0.45 μm. The filtrate was titrated with EDTA to determine calcium in the filtrate. The determined amount was represented by C (mg/l). The test liquid not containing hydrophilic graft polymer-containing composition was treated in the same manner as above to determine calcium. The determined amount was represented by B (mg/l). B and C were introduced into the following equation, and percentage of scale inhibition was calculated.

$$\text{Percentage of scale inhibition}(\%) = (C-B)/(100-B) \times 100$$

[Dispersibility test]

50 mg of hydrophilic graft polymer-containing composition were added to 100 ml of a colorimetric pipe (inner diameter 2.5 cm) with a plug, and water was further added thereto to be 100 ml in the total. Sodium hydroxide aqueous solution was added dropwise to the colorimetric pipe to adjust pH of the contents in the colorimetric pipe to 8.5. 2 g of manganese dioxide powder (obtained by drying reagent (for chemical) of Wako Pure Chemicals) were further added thereto, and the colorimetric pipe was shaken up and down 100 times, and was allowed to stand for 4 hours. 1 ml of test liquid was collected by a whole pipet from the colorimetric pipe at a height of 15 cm from the bottom, and concentration of manganese dioxide contained in the test liquid was determined by a permanganate method. Dispersibility is high as the concentration of manganese dioxide is high.

[Gelation resistance test]

1,000 ml of a test liquid (Politzsch's buffer liquid) having pH of 8.5 in which concentration of the hydrophilic graft polymer-containing composition was 5 mg/l, and concentration of calcium chloride was 223 mg/g was provided. This test liquid was allowed to stand at 60° C. for 20 hours, and was filtered with a membrane filter of 1 μm. Concentration of the composition in the filtrate was determined using a calibration curve previously prepared with TOC measurement device. Gelation resistance is high as concentration of the composition is high.

EXAMPLE 2

170 Parts by weight of methoxypolyethylene glycol having weight-average molecular weight of 5,000 (number-average molecular weight: 4,500), and 12.3 parts by weight of maleic acid were charged into a glass reactor equipped with a thermometer, a stirrer, a nitrogen introduction pipe, and a reflux condenser, and the charged materials were heated under nitrogen stream to obtain a solution. This solution was heated to a temperature of 130° C. under stirring. Next, while maintaining the temperature of liquid at 129 to 132° C., 17.8 parts by weight of acrylic acid, and 2.7 parts by weight of PERHEXA V (containing 90% of n-butyl-4,4'-bis(tert-butylperoxy) octane, a product of Nippon Oils and Fats Co.) were added dropwise to the above solution for 20 minutes. Then, for 1 hour, stirring of the reaction mixture was continued to obtain a hydrophilic graft polymer-containing composition. Viscosity of this composition was measured using a B-type viscometer, and was found to be 14,000 cps (100° C.).

As a result of analyzing the obtained composition in the same manner as in Example 1, it was found that the composition contained methoxypolyethylene glycol (polyether compound) having weight-average molecular weight of 5,000, a hydrophilic graft polymer (weight-average molecular weight 20,000) comprising a polyether moiety, and a graft chain moiety in which maleic acid and acrylic acid were graft-polymerized, and an unsaturated carboxylic acid type polymer (weight-average molecular weight 1,800) in which maleic acid and acrylic acid were copolymerized. The polyether moiety/graft chain moiety in this hydrophilic graft polymer was 79/21.

Mutual proportions of the hydrophilic graft polymer, polyether compound, and unsaturated carboxylic acid type polymer, contained in the composition obtained were that the hydrophilic graft polymer was 72% by weight, the polyether compound was 27% by weight, and the unsaturated carboxylic acid type polymer was 1% by weight, in the total of three components.

Scale inhibition performance test, dispersibility test, and gelation resistance test were conducted on the composition obtained in the same manner as in Example 1. As a result, percentage of scale inhibition was 80%, dispersibility was 510 ppm, and gelation resistance was 5 ppm.

COMPARATIVE EXAMPLE 1

100 Parts by weight of polyethylene glycol having weight-average molecular weight of 200,000 (number-average molecular weight: 180,000), and 20 parts by weight of water were charged into a glass reactor equipped with a thermometer, a stirrer, a nitrogen introduction pipe, and a reflux condenser, and the charged materials were heated under nitrogen stream to obtain a solution. This solution was heated to a temperature of 100° C. under stirring. 52 Parts by weight of acrylic acid, and 2.6 parts by weight of PERBUTYL O (containing 97% of tert-butylperoxy-2-ethylhexanate, a product of Nippon Oils and Fats Co.) were added dropwise to the above solution. Heating the reaction mixture was continued at 120° C. for 2 hours to obtain a comparative composition. It was attempted to measure viscosity of this composition using a B-type viscometer, but measurement could not be made due to too high viscosity.

As a result of analyzing the obtained comparative composition in the same manner as in Example 1, it was found that the composition contained ethylene glycol (polyether compound) having weight-average molecular weight of 210,000, a hydrophilic graft polymer (weight-average molecular weight 280,000) comprising a polyether moiety, and a graft chain moiety in which maleic acid and acrylic acid were graft-polymerized, and an unsaturated carboxylic acid type polymer (weight-average molecular weight 13,500) in which acrylic acid was polymerized. The polyether part/graft chain moiety in this hydrophilic graft polymer was 50/50.

Mutual proportions of the hydrophilic graft polymer, polyether compound, and unsaturated carboxylic acid type polymer, contained in the comparative composition obtained were that the hydrophilic graft polymer was 46% by weight, the polyether compound was 43% by weight, and the unsaturated carboxylic acid type polymer was 11% by weight, in the total of three components.

Scale inhibition performance test, dispersibility test, and gelation resistance test were conducted on the composition obtained in the same manner as in Example 1. As a result, percentage of scale inhibition was 13%, dispersibility was 130 ppm, and gelation resistance was 1 ppm.

COMPARATIVE EXAMPLE 2

200 Parts by weight of methoxypolyethylene glycol having weight-average molecular weight of 480 (number-average molecular weight: 470) were charged into a glass reactor equipped with a thermometer, a stirrer, a nitrogen introduction pipe, and a reflux condenser, and were heated under nitrogen stream to obtain a solution. This solution was heated to a temperature of 128° C. under stirring. Next, while maintaining the temperature at 128 to 131° C., 21 parts by weight of acrylic acid, and 1.9 parts by weight of PERHEXA V (containing 90% of n-butyl-4,4'-bis(tert-butylperoxy)octane, a product of Nippon Oils and Fats Co.) were added dropwise to the above solution over 30 minutes. Then, for 1 hour, stirring of the reaction mixture was continued to obtain a comparative composition. Viscosity of this comparative composition was measured using a B-type viscometer, and was found to be 3,000 cps (100° C.).

As a result of analyzing the obtained comparative composition in the same manner as in Example 1, it was found that the composition contained methoxypolyethylene glycol (polyether compound) having weight-average molecular weight of 500, a hydrophilic graft polymer (weight-average molecular weight 3,900) comprising a polyether moiety, and a graft chain moiety in which acrylic acid was graft-polymerized, and an unsaturated carboxylic acid type polymer (weight-average molecular weight 3,500) in which acrylic acid was polymerized. The polyether moiety/graft chain moiety in this hydrophilic graft polymer was 83/17.

Mutual proportions of the hydrophilic graft polymer, polyether compound, and unsaturated carboxylic acid type polymer, contained in the comparative composition obtained were that the hydrophilic graft polymer was 54% by weight, the polyether compound was 45% by weight, and the unsaturated carboxylic acid type polymer was 1% by weight, in the total of three components.

Scale inhibition performance test, dispersibility test, and gelation resistance test were conducted on the comparative composition obtained in the same manner as in Example 1. As a result, percentage of scale inhibition was 24%, dispersibility was 290 ppm, and gelation resistance was 5 ppm.

EXAMPLE 3

100 Parts by weight of phenoxypolyethylene glycol (obtained by adding 10 moles, on average, of ethylene oxide to phenol) having a number-average molecular weight of 530, 51.8 parts by weight of maleic acid, and 5 parts by weight of p-toluenesulfonic acid monohydrate were charged into a glass reactor equipped with a thermometer, a stirrer, a nitrogen introduction pipe, and a reflux condenser. The resulting charged mixture was dissolved by heating under nitrogen stream, and temperature was raised to 128° C. under stirring. While maintaining the temperature at 125 to 131° C., 48.2 parts by weight of acrylic acid, and 10 parts by weight of PERBUTYL Z (containing 98% tert-butyl peroxybenzoate, a product of Nippon Oils and Fats Co.) were separately added dropwise continuously for 1 hour, and stirring was then continued for 1 hour to obtain a graft polymer.

The graft ratio of the graft polymer obtained was 93%, and the purity was 96.5%. The following scale inhibition performance test was conducted on this graft polymer. As a result, the percentage of scale inhibition was 50%.

EXAMPLE 4

100 Parts by weight of methoxypolyethylene glycol (obtained by adding 10 moles, on average, of ethylene oxide to methanol) having a number-average molecular weight of 470, 52.3 parts by weight of maleic acid, and 4.5 parts by weight of sulfuric acid were charged into a glass reactor equipped with a thermometer, a stirrer, a nitrogen introduction pipe, and a reflux condenser. The resulting charged mixture was dissolved by heating under nitrogen stream, and temperature was raised to 126° C. under stirring. While maintaining the temperature at 124 to 129° C., 47.5 parts by weight of acrylic acid, and 10 parts by weight of PERBUTYL Z (containing 98% tert-butyl peroxybenzoate, a product of Nippon Oils and Fats Co.) were separately added dropwise continuously for 1 hour, and stirring was then continued for 1 hour to obtain a graft polymer.

The graft ratio of the graft polymer obtained was 89%, and the purity was 94.5%. The following scale inhibition performance test was conducted on this graft polymer. As a result, the percentage of scale inhibition was 48%.

EXAMPLE 5

110 Parts by weight of phenoxypolyethylene glycol (obtained by adding 10 moles, on average, of ethylene oxide to phenol) having a number-average molecular weight of 530, 53.2 parts by weight of maleic acid, and 6 parts by weight of phosphoric acid were charged into a glass reactor equipped with a thermometer, a stirrer, a nitrogen introduction pipe, and a reflux condenser. The resulting charged mixture was dissolved by heating under nitrogen stream, and temperature was raised to 128° C. under stirring. While maintaining the temperature at 125 to 130° C., 49.4 parts by weight of acrylic acid, and 10 parts by weight of PERBUTYL Z (containing 98% tert-butyl peroxybenzoate, a product of Nippon Oils and Fats Co.) were separately added dropwise continuously for 1 hour, and stirring was then continued for 1 hour to obtain a graft polymer.

The graft ratio of the graft polymer obtained was 93%, and the purity was 96.5%. The following scale inhibition performance test was conducted on this graft polymer. As a result, the percentage of scale inhibition was 51%

COMPARATIVE EXAMPLE 3

7 Parts by weight of methoxypolyethylene glycol (obtained by adding 45 moles, on average, of ethylene oxide to methanol) having a number-average molecular weight of 2,000, and 13.9 parts by weight of maleic acid were charged into a glass reactor equipped with a thermometer, a stirrer, a nitrogen introduction pipe, and a reflux condenser. The resulting charged mixture was dissolved by heating under nitrogen stream, and temperature was raised to 145° C. under stirring. While maintaining the temperature at 145 to 147° C., 19 parts by weight of acrylic acid, and 1.7 parts by weight of PERBUTYL D (containing 98% di-tert-butyl peroxide, a product of Nippon Oils and Fats Co.) were separately added dropwise continuously for 1 hour, and stirring was then continued for 1 hour to obtain a comparative graft polymer.

The graft ratio of the comparative graft polymer obtained was 75%, and the purity was 74%. The following scale inhibition performance test was conducted on this comparative graft polymer. As a result, the percentage of scale inhibition was 40%.

EXPERIMENTAL EXAMPLE 1

100 Parts by weight of phenoxypolyethylene glycol having a number-average molecular weight of 300, and 20 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. under stirring. While maintaining the temperature at 145 to 147° C., 70 parts by weight of acrylic acid and 2.5 parts by weight of di-t-butyl peroxide were separately added dropwise continuously for 1 hour, and stirring was further continued for 80 minutes to obtain a graft polymer 1.

EXPERIMENTAL EXAMPLE 2

100 Parts by weight of polyethylene glycol having a number-average molecular weight of 800, and 10 parts of maleic acid were charged into a glass reactor equipped with a thermometer, a stirrer, a nitrogen introduction pipe, and a reflux condenser, and were dissolved by heating under nitrogen stream. Temperature was raised to 150° C. under stirring. While maintaining the temperature at 150 to 151° C., 50 parts by weight of acrylic acid, 4.5 parts by weight of di-t-butyl peroxide, and 10 parts by weight of sulfoethyl acrylate were separately added dropwise continuously for 1 hour, and stirring was further continued for 40 minutes to obtain a graft polymer 2.

EXPERIMENTAL EXAMPLE 3

100 Parts by weight of polyethylene glycol having a number-average molecular weight of 200, and 20 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. While maintaining the temperature at 145 to 147° C., 75 parts by weight of acrylic acid, and 1.5 parts by weight of di-t-butyl peroxide were separately added dropwise continuously for 1 hour, and stirring was further continued for 90 minutes to obtain a graft polymer 3.

EXPERIMENTAL EXAMPLE 4

100 Parts by weight of phenoxypolyethylene glycol having a number-average molecular weight of 300, and 20 parts by weight of maleic acid were charged into a glass reactor equipped with a thermometer, a stirrer, a nitrogen introduction pipe, and a reflux condenser, and were dissolved by heating under nitrogen stream. Temperature was raised to 120° C. under stirring. While maintaining the temperature at 115 to 120° C., 40 parts by weight of acrylic acid, 30 parts by weight of hydroxyethyl methacrylate, and 3.5 parts by weight of di-t-butyl peroxide were separately added dropwise continuously for 1 hour, and stirring was further continued for 60 minutes to obtain a graft polymer 4.

EXPERIMENTAL EXAMPLE 5

100 Parts by weight of phenoxypolyethylene glycol having a number-average molecular weight of 500, and 7 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. under stirring. While maintaining the temperature at 145 to 147° C., 40 parts by weight of acrylic acid, 5 parts by weight of allyl alcohol, and 2.5 parts by weight of di-t-butyl peroxide were separately added dropwise continuously for 1 hour, and stirring was further continued for 60 minutes to obtain a graft polymer 5.

EXPERIMENTAL EXAMPLE 6

100 Parts by weight of monomethoxypolyethylene glycol having a number-average molecular weight of 300, and 30 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. under stirring. While maintaining the temperature at 145 to 147° C., 30 parts by weight of acrylic acid, 6 parts by weight of 3-allyloxy-2-hydroxypropanesulfonic acid, and 1.5 parts by weight of di-t-butyl peroxide were separately added dropwise continuously for 1 hour, and stirring was further continued for 60 minutes to obtain a graft polymer 6.

EXPERIMENTAL EXAMPLE 7

100 Parts by weight of monomethoxypolyethylene glycol having a number-average molecular weight of 5,000, and 5 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. under stirring. While maintaining the temperature at 145 to 147° C., 30 parts by weight of acrylic acid and 2.5 parts by weight of di-t-butyl peroxide were separately added dropwise continuously for 1 hour, and stirring was further continued for 60 minutes to obtain a graft polymer 7.

EXPERIMENTAL EXAMPLE 8

100 Parts by weight of monomethoxypolyethylene glycol having a number-average molecular weight of 2,000, and 5 parts by weight of maleic acid were charged into a glass reactor equipped with a thermometer, a stirrer, a nitrogen introduction pipe, and a reflux condenser, and were dissolved by heating under nitrogen stream. Temperature was raised to 145° C. under stirring. While maintaining the temperature at 145 to 147° C., 25 parts by weight of acrylic acid and 2.5 parts by weight of di-t-butyl peroxide were separately added dropwise continuously for 1 hour, and stirring was further continued for 60 minutes to obtain a graft polymer 8.

EXPERIMENTAL EXAMPLE 9

120 Parts by weight of polyethylene glycol having a number-average molecular weight of 150, and 41.4 parts by weight of maleic acid were charged into a glass reactor equipped with a thermometer, a stirrer, a nitrogen introduction pipe, and a reflux condenser, and were dissolved by heating under nitrogen stream. Temperature was raised to 128° C. under stirring. While maintaining the temperature at 128° C.±2° C., 38.6 parts by weight of acrylic acid and 4 parts by weight of t-butylperoxybenzoate were separately added dropwise continuously for 2 hours, and stirring was further continued for 60 minutes to obtain a graft polymer 9.

EXPERIMENTAL EXAMPLE 10

120 Parts by weight of polyethylene glycol having a number-average molecular weight of 130 (a mixture of diethylene glycol, triethylene glycol and tetraethylene glycol), and 41.4 parts by weight of maleic acid were charged into a glass reactor equipped with a thermometer, a stirrer, a nitrogen introduction pipe, and a reflux condenser, and were dissolved by heating under nitrogen stream. Temperature was raised to 128° C. under stirring. While maintaining the temperature at 128° C.±2° C., 38.6 parts by weight of acrylic acid and 4 parts by weight of t-butylperoxybenzoate were separately added dropwise continuously for 2 hours, and stirring was further continued for 60 minutes to obtain a graft polymer 10.

EXAMPLE 6

(Scale inhibition test of calcium phosphate)

164 g of pure water, 10 ml of 0.1% sodium hydrogen phosphate dodecahydrate aqueous solution, 10 ml of 0.73% calcium chloride dihydrate aqueous solution, 6 ml of 0.1% graft polymer aqueous solution, and 10 ml of 0.2% sodium hydrogen carbonate aqueous solution were added to a 200 cc lidded glass vessel, and pH was adjusted to 8.5 using 0.1 N sodium hydroxide aqueous solution. The glass vessel was covered with the lid, and was allowed to stand under the condition of 60° C. for 20 hours. After cooling with flowing water for 15 minutes, the mixture was filtered with a membrane filter of 0.45 microns, and phosphorus concentration in the filtrate was measured by ICP analysis.

The same measurement was conducted on the system not containing the graft polymer, and percentage of scale inhibition of calcium phosphate was obtained by the following calculation method. The results are shown in Table 1.

Percentage of scale inhibition of calcium phosphate=[(measurement value of graft copolymer−measurement value without graft polymer)/(10−measurement value without graft polymer)]×100 (%)

EXAMPLE 7

(Scale inhibition test of zinc hydroxide)

160 g of pure water, 10 ml of 0.04% zinc nitrate hexahydrate aqueous solution, 10 ml of 0.73% calcium chloride dihydrate aqueous solution, 10 ml of 0.1% graft polymer aqueous solution, and 10 ml of 0.2% sodium hydrogen carbonate aqueous solution were added to a 200 cc lidded glass vessel, and pH was adjusted to 8.5 using 0.1 N sodium hydroxide aqueous solution. The glass vessel was covered with the lid, and was allowed to stand under the condition of 60° C. for 20 hours. After cooling with flowing water for 15 minutes, the mixture was filtered with a membrane filter of 0.45 microns, and zinc concentration in the filtrate was measured by ICP analysis.

The same measurement was conducted on the system not containing the graft polymer, and percentage of scale inhibition of zinc hydroxide was obtained by the following calculation method. The results are shown in Table 1.

Percentage of scale inhibition of zinc hydroxide=[(measurement value of graft copolymer−measurement value without graft polymer)/(5−measurement value without graft polymer)]×100 (%)

TABLE 1

| Graft Polymer | Weight-Average Molecular Weight | Hydroxyl Group Value mg/KOH/g | Acid Value mg KOH/g | Percentage of Scale Inhibition of Calcium Phosphate (Example 6) | Percentage of Scale Inhibition of Zinc Hydroxide (Example 7) |
|---|---|---|---|---|---|
| 1 | 5200 | 98 | 388 | 88 | 73 |
| 2 | 5600 | 73 | 285 | 85 | 70 |
| 3 | 4306 | 287 | 398 | 91 | 85 |
| 4 | 4500 | 165 | 265 | 83 | 99 |
| 5 | 4000 | 105 | 249 | 82 | 77 |
| 6 | 4960 | 122 | 315 | 87 | 82 |
| 7 | 11000 | 8.2 | 209 | 80 | 2 |
| 8 | 7200 | 22 | 187 | 65 | 25 |
| 9 | 3000 | 358 | 310 | 95 | 89 |
| 10 | 2800 | 361 | 308 | 94 | 89 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a hydrophilic graft polymer, which comprises the step of graft-polymerizing a monoethylenically unsaturated monomer containing an unsaturated COO group containing monomer onto a polyether compound having a repeating unit represented by the following general formula:

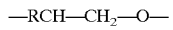

(wherein R represents at least one of a hydrogen atom and a methyl group, and both may be present in one molecule) in an amount of 30 mol % or more of the whole of the polyether compound in the presence of an organic peroxide and at least one acidic substance selected from the group consisting of organic sulfonic acid compounds, phosphoric acid compounds, and inorganic acids.

2. A process according to claim 1, wherein the proportion of the unsaturated COO group containing monomer in the monoethylenically unsaturated monomer is 60% by weight or more.

3. A process according to claim 1, wherein the unsaturated COO group containing monomer is at least one member selected from the group consisting of (meth)acrylic acid, maleic acid, maleic anhydride, fumaric acid, and an ester which forms a carboxylic acid by hydrolysis, and the ester is at least one member selected from the group consisting of (meth)acrylic acid esters, maleic acid esters, and fumaric acid esters.

4. A process according to claim 1, wherein at least one of R in the repeating unit is a hydrogen atom.

5. A process according to claim 2, wherein the unsaturated COO group containing monomer is at least one member selected from the group consisting of (meth)acrylic acid, maleic acid, maleic anhydride, fumaric acid, and an ester which forms a carboxylic acid by hydrolysis, and the ester is at least one member selected from the group consisting of (meth)acrylic acid esters, maleic acid esters, and fumaric acid esters.

6. A process according to claim 2, wherein at least one of R in the repeating unit is a hydrogen atom.

7. A process according to claim 3, wherein at least one of R in the repeating unit is a hydrogen atom.

* * * * *